May 28, 1940.  W. LA HODNY  2,202,697
MIRROR
Filed Jan. 18, 1938
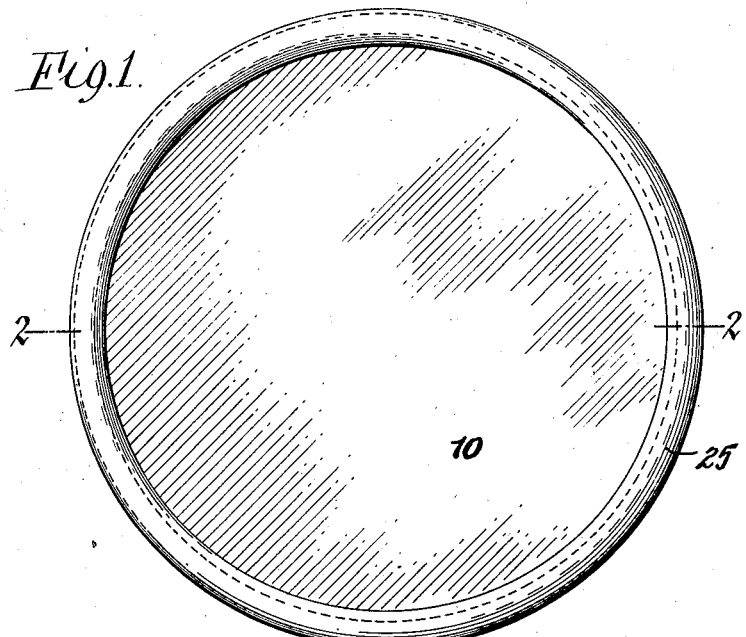
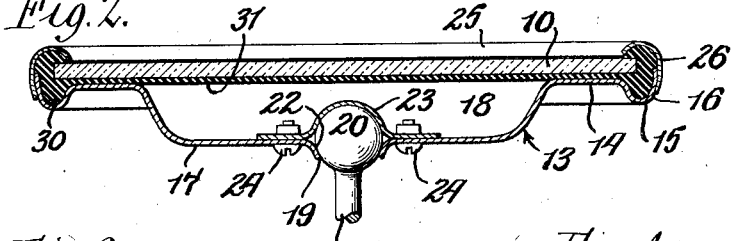
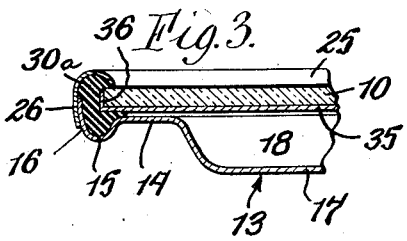
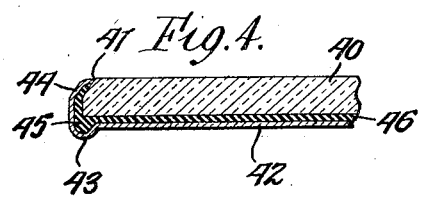
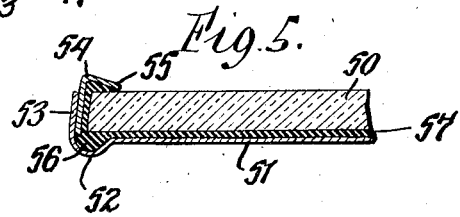
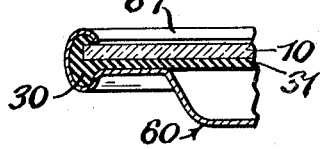
Inventor
William La Hodny
by Poppa and Poppa
Attorneys Patented May 28, 1940

2,202,697

UNITED STATES PATENT OFFICE 2,202,697

MIRROR

William La Hodny, Buffalo, N. Y.

Application January 18, 1938, Serial No. 185,567

3 Claims. (Cl. 88—98)

This invention relates to a mirror and more particularly to an encased mirror, such as a rear vision mirror, which is subjected to weather conditions, the principal object of this invention being to provide a reliable seal which prevents water from entering the case or condensing therein so as to deleteriously affect the silvering of the mirror, by providing a container of a yielding material, such as rubber into which the glass mirror panel is set so as to have its edges embraced thereby, this assembly being set into a metal container or back and the edges of the metal container compressing the edges of the rubber so as to provide a continuously tight seal for the mirror.

In the use of rear vision mirrors considerable difficulty has been encountered in protecting the silvering of the mirror where the rear vision mirror is exposed to the elements. The silvered mirror panel is generally encased or held in a metal holder and where the mirror is supported by a universal friction joint the back of this case or holder may be formed to provide a large chamber which receives and forms a seat for the supporting ball. When such mirrors are used outside of the cab, water enters around the edges of the mirror and also enters the opening provided for the supporting ball. In addition, water condenses in the relatively large chamber provided at the back of the mirror. Such water attacks the protecting paint over the mirror silvering and in a relatively short time works through to the silvering destroying its reflective properties and rendering the rear vision mirror useless.

It is the principal object of the present invention to provide a seal made of rubber or similar yielding material, and preferably in the form of a container for the mirror panel, which is interposed between the glass mirror panel and its case or holder and held in a compressed condition against the glass mirror panel so as to entirely prevent water from seeping around the margins of the mirror panel and attacking its reflective coating.

It is another object of the present invention to provide such a marginal seal which also includes a diaphragm, preferably made of rubber or the like, which extends across the back of the mirror panel in non-adhesive engagement therewith and which not only protects the silver against contamination by water entering at places, other than around the margin of the mirror panel, such as around the universal ball, but also prevents water from condensing on the rear face of the mirror panel.

Another object of the invention is to provide a mirror panel encased by a rubber pad and in which the rubber pad is encased in a metal holder which holds the rubber pad in tight sealing engagement with the mirror panel so as to completely protect the mirror panel from moisture.

Another object of the invention is to provide such a sealing means which can be incorporated in a rear vision mirror or the like at very little additional expense; which forms a resilient mounting for the glass mirror panel to reduce the danger of breakage, and which can be embodied in a rear vision mirror or the like of any shape or size.

In the accompanying drawing:

Fig. 1 is a front elevation of a rear vision mirror made in accordance with the preferred form of my invention.

Fig. 2 is a section taken on line 2—2, Fig. 1.

Figs. 3, 4, 5 and 6 are fragmentary views similar to Fig. 2 showing modified forms of my invention.

In the form of the invention shown in Figs. 1 and 2 the mirror panel is made of a round piece of glass 10 having the usual silvering (not shown) provided on its rear face, which silvering can also be protected by a lacquer coating if desired. The holder or case for this mirror panel includes a round backing member 13 which is formed to provide a circular flat portion 14 adapted to bear against the rear of the mirror panel 10 and also formed to provide a forwardly facing marginal chanel 15 terminating in a forwardly extending rim 16. The central portion 17 of the backing member 13 is offset rearwardly to form a relatively large chamber 18, this offset portion being provided with a central hole 19 receiving the ball 20 of a supporting member 21, this ball being located within the chamber 18 and being seated against a rearwardly offset seat 22 provided around the opening 19. The ball 20 is held frictionally in engagement with the seat 22 by a small plate 23 secured to the inner face of the rearwardly offset portion 17 by bolts 24, or the like and bearing against the front side of the ball.

The mirror panel is held in position by a ring 25 which has its inner edge arranged in advance of the mirror panel 10 and has its rim 26 arranged to extend over the forwardly projecting rim 16 of the backing member 13. To secure the mirror panel 10, the backing member 13 and ring 25 together, the rearwardly extending part 26 of the ring 25 is spun down around the forwardly projecting rim 16 of the backing member 13.

In the absence of provision to prevent it, water will condense in the chamber 18 and attack the silvering on the mirror panel 10. Further, when the rear vision mirror is subjected to weather conditions, water will seep under the ring 25 and around the margin of the mirror panel 10 and also attack the silvering. Also water can enter the chamber 18 from around the ball 20 and attack the silvering. To avoid these difficulties I provide a container of rubber or the like which is preferably in the form of a pad and includes a rim portion 30 embracing the rim of the mirror panel 10 and held under compression therearound by the ring 25 and also an integral diaphragm or back 31 which extends across the back of the mirror panel in engagement therewith but having no adhesive connection to the mirror panel. The rim portion 30 is preferably made of substantial size to completely fill the channel 15 and the space within the ring 25 when the ring is pressed toward the backing member and its rear edge spun down.

In assembling the mirror the rubber rim 30, together with its diaphragm, is set into the channel 15 of the backing member 13; the mirror panel 10 is set into the dish-like pocket formed by the rubber seal 30, 31 and the ring 25 is then placed over the rim 30 and pressed down so as to compress the rubber rim into the ring 25 and against the front and rear faces and the edge at the margin of the mirror panel 10. The rearwardly extending flange 26 of the ring member 25 can then be spun down so as to hold the parts in this relation and the rubber in a compressed condition around the margin of the mirror panel.

It will be seen that the margin of the mirror panel 10 is thereby completely protected against the passage of water from the front face of the mirror to its silvered face and that the diaphragm 31 protects the back of the mirror both against water entering the opening 19 and also against water condensing in the chamber 18. The mirror is therefore completely encased by a rubber pad except for its obverse face and the margin of this pad is held tightly around the margin of the mirror panel by the encasing holder so as to positively prevent the seepage of water around the margin of the mirror.

A modified form of the invention is illustrated in Fig. 3. In this form of the invention the silvered mirror panel 10 is backed by a metal backing plate 35, this backing plate being made of comparatively thin metal and the edge 36 of this thin metal backing plate which can be spun, if desired, around the margin of the mirror panel 10. It will be seen that the metal backing plate 35 obviates the necessity of a rubber diaphragm across the back of the mirror panel 10 and therefore the rubber ring 30a is of the same form as the rim 30 in the construction shown in Figs. 1 and 2, the rubber diaphragm 31 being eliminated. In other respects the mirror shown in Fig. 3 is formed and assembled in the same manner as that shown in Figs. 1 and 2.

It will also be seen that the invention is capable of use with a mirror encased by a flat metal backing plate. In the example shown in Fig. 4 the mirror panel 40 is shown as having a beveled edge 41 and is provided on its back with the usual silvering (not shown). The metal back 42 is of flat form and is formed at its edges to provide a forwardly opening channel 43 and a rim 44 extending forwardly therefrom. The means for sealing the mirror panel comprises a rubber member having a rim 45 setting within the channel 43 and also between the flange 44 and the adjacent rim of the mirror 40 and a diaphragm 46 extending across the back of the mirror panel. In fabricating this mirror the flange 44 is spun inwardly so as to compress the rubber rim around the margin of the mirror panel 40 and provide a water tight seal.

The invention can also be incorporated in a framed backing plate forming a one piece holder for the mirror. Such a construction is illustrated in Fig. 6 in which the silvered mirror panel 10 is backed by a metal backing plate 60, the rim 61 of which is extended forwardly sufficiently far so that it can be turned or spun around the forward part of the rim portion 30 of a pad of rubber or the like, this pad preferably being of the same form as that illustrated in Figs. 1 and 2 and having a diaphragm 31 extending across the reverse face of the mirror. It will be seen that upon turning the rim 61 over to exert pressure on the rubber rim 30, an effective seal for the mirror plate will be provided in the same manner as in the form of the invention illustrated in Figs. 1 and 2. At the same time the mirror holder is made of one piece of metal.

Another example of a sealed mirror held in a flat metal back is shown in Fig. 5. In this form the glass mirror panel 50 has the usual silvered back (not shown) and is provided with a metal backing plate 51 having a forwardly opening channel 52 at its margin which terminates in a forwardly extending flange 53. A ring 54 is placed around the glass panel 50 and has an inwardly extending flange 55. The ring 54 is arranged within the flange 53 and the rim 56 of the rubber seal extends around the margin of the glass panel 50, an integral rubber diaphragm being also provided as in the form shown in Fig. 4. In assembling the mirror, the ring 54 is pressed downwardly to force the rubber under pressure around the margin of the glass panel and the flange 53 is then spun down to hold the parts in this condition.

From the foregoing it will be seen that the present invention provides a very simple, inexpensive and reliable means for sealing an encased mirror panel against the entrance of water between the case and the margin of the glass panel and also further protects the silvering against any water entering at any other point or condensing within any chamber it may be desirable to provide in the case.

I claim as my invention:

1. A mirror structure, comprising a transparent mirror panel provided with a reflective coating on its rear face, a metal holder for said panel and including a rigid rim formed at its margin to provide an enlarged internal channel receiving the margin of said mirror panel and the front part of said rim being extended inwardly in front of said panel, and a sealing member composed of rubber including an enlarged rim fitting said channel and embracing the margin of said panel and held under compression against its front and rear faces and its edge by said rigid rim and said sealing member also including a thin, imperforate, rubber diaphragm having its margin integrally formed with said rubber rim, said diaphragm extending across the entire coating face of said mirror panel in nonadhesive engagement therewith.

2. A mirror structure, comprising a transparent mirror panel provided with a reflective coating on its rear face, a metal holder for said panel and including a metal back having an integral forwardly extending rigid rim providing a relatively deep internal channel arranged in rear of the margin of said mirror panel, a sealing member composed of rubber including an enlarged rim having its rear portion filling said channel and said rubber rim embracing the margin of said mirror panel and said sealing member also including a thin, imperforate rubber diaphragm having its margin integrally formed with said rubber rim, said diaphragm extending across the entire coating face of said mirror panel in nonadhesive engagement therewith and means for holding said rubber rim under compression comprising a metal marginal member engaging the front part of said rubber rim and pressing thereagainst, said metal rim and metal marginal member including flanges crimped to one another to maintain the compressed condition of said rubber rim and its sealing engagement with said mirror panel.

3. A mirror structure, comprising a transparent mirror panel provided with a reflective coating on its rear face, a metal holder for said panel and including a metal back having an integral forwardly extending rigid rim providing a relatively deep internal channel arranged in rear of the margin of said mirror panel, a sealing member composed of rubber including an enlarged rim having its rear portion filling said channel and said rubber rim embracing the margin of said mirror panel and said sealing member also including a thin, imperforate rubber diaphragm having its margin integrally formed with said rubber rim, said diaphragm extending across the entire coating face of said mirror panel in nonadhesive engagement therewith, and means for holding said rubber rim under compression, comprising a metal marginal member formed to provide an internal channel receiving the front enlarged part of said rubber rim and filled thereby, said metal rim and metal marginal member including flanges crimped to one another to maintain the compressed condition of said rubber rim in said channels and its sealing engagement with said mirror panel.

WILLIAM LA HODNY.